United States Patent Office 3,360,360
Patented Dec. 26, 1967

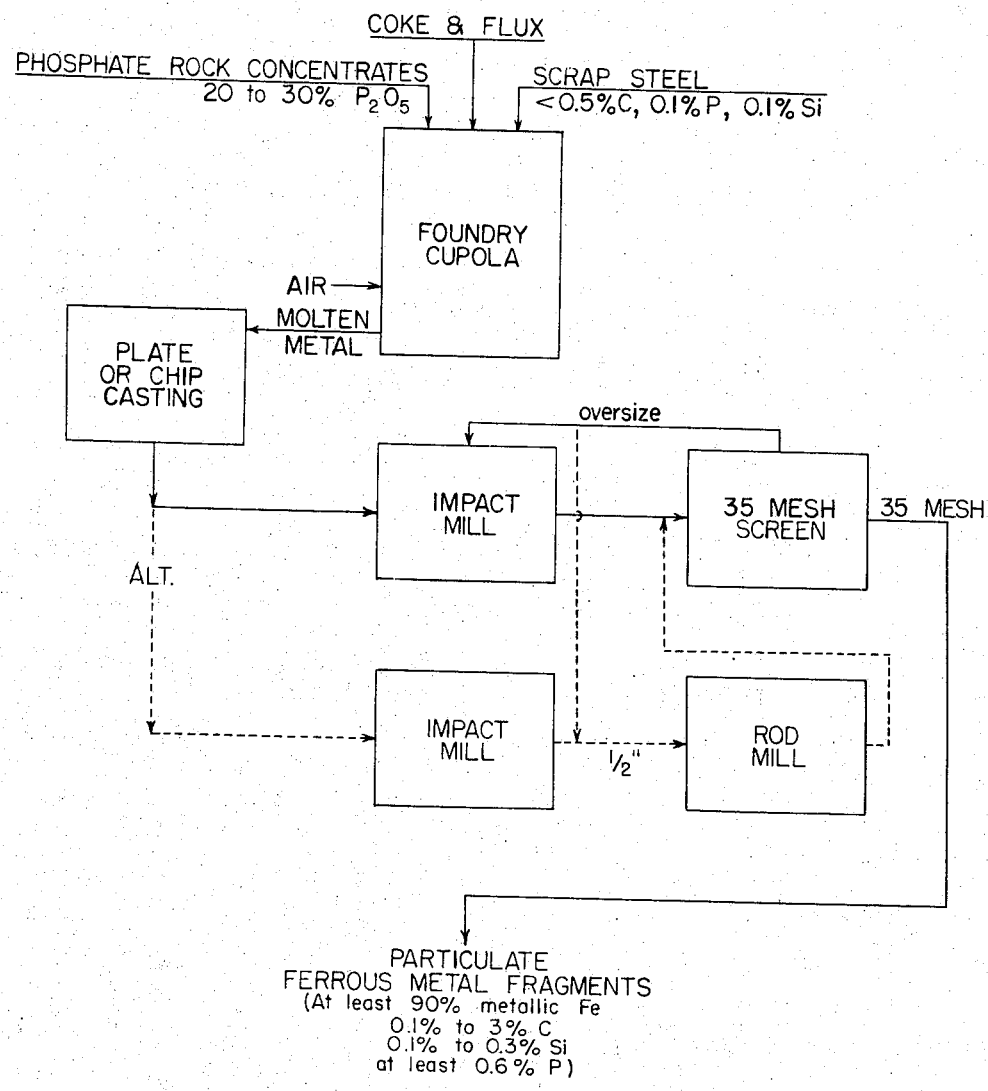

3,360,360
FERROUS METAL PRODUCT USEFUL AS A PRECIPITANT AND PROCESS OF MANUFACTURING IT
Stuart R. Zimmerley and Russell R. Beck, Salt Lake City, Utah, assignors to Kennecott Copper Corporation, New York, N.Y., a corporation of New York
Filed Oct. 21, 1964, Ser. No. 405,449
8 Claims. (Cl. 75—.5)

This invention relates to ferro-metallurgical products of manufacture useful primarily as precipitants for copper values in solution, chiefly dilute acid leach solutions.

It is well known that copper values in solution replace metallic iron, and it is common practice to flow copper-bearing, weakly acidic solutions—derived by leaching the dumps of copper mines—over detinned and shredded cans or other forms of scrap steel and iron for recovering the copper.

Scrap used as a precipitant for copper values from solution leaves much to be desired. It becomes coated with the precipitated copper, which must be flushed off with high pressure jets of water if the iron is to be used to the maximum extent. Even then, it is not always possible to utilize fully the metallic iron content. Moreover, scrap is not usually readily available in the necessary quantity in mining areas.

Although so-called "sponge" iron is a very efficient metallic iron product for the purpose, there are problems associated with its manufacture and use, which, along with its relatively high cost, have greatly restricted its adoption.

It has long been recognized that metallic iron in finely divided condition would be an ideal precipitant for copper values in solution, but the difficulty and expense of dividing it into sufficiently fine particles of such character as to provide the requisite surface area for the purpose has precluded its use.

A principal object in the making of the present invention was to provide a finely-divided, ferrous metal product having outstanding qualities as a precipitant for copper values in solution and capable of being easily produced in requisite quantities at low cost in standard production equipment, for example, in a foundry cupola and a conventional crusher. It is essential that the product be low in cost for its intended use as a precipitant. Otherwise, it has no commercial utility.

In keeping with this object, the particulate product of the invention is characterized by exceptionally high surface-to-weight ratio as compared with usual forms of metallic iron reduced to a powder by grinding. This high surface-to-weight ratio is due to the fact that the discrete particles making up the product are rough fragments produced by breaking a highly brittle, metallic iron, and contribute significantly to the reactive nature of the product.

A very desirable and preferred feature of the product is low silicon content, so there is a minimum amount of unreactive material in the product and so the copper precipitate going to the smelter carries a minimum of deleterious and diluting material.

Phosphorous is a common impurity in iron in limited amount, e.g. 0.1% by weight. The fact that it makes castings brittle and easily broken when present in a metallic iron melt to the extent of about 1.0% by weight has long been known in connection with the casting of certain items, such as stove parts, where the presence of a high percentage of phosphorous proves advantageous in increasing the fluidity of the melt and making it capable of filling intricate molds. Except for this, however, the effort has been to keep the phosphorous content as low as possible to avoid fragility of the resulting product.

Steel has very little if any phosphorous, ordinarily not over 0.05%. Phosphorous is considered to be a highly undesirable impurity in steel, and, rather than using a phosphorous-containing material as an additive, every effort is made by steel makers to keep the phosphorous content as low as possible.

Cast iron scrap is ordinarily available only at a premium price that prohibits its use as a precipitant. Although some cast iron is often found in what is commercially known as scrap iron, steel invariably predominates by far in commercial scrap iron. The over-all phosphorous content of an iron melt produced from commercial scrap will be very low. Moreover, the silicon content will also be low, not more than about 0.3%, due to the predominantly steel make-up of the scrap.

In accordance with the present invention, a low cost, reactive, ferrous metal product, ideal for use as a precipitant for copper in solution, is produced by melting such commercial scrap iron (essentially steel), analyzing it for phosphorous content, and adding phosphorous or a phosphorous-bearing material in quantity sufficient to give the melt a phosphorous content of at least 0.6% by weight, but preferably higher, e.g. from one to two percent or more. The phosphorous content not only makes the metal, as cast, highly brittle and subject to easy fragmentation into discrete particles having a high surface-to-weight ratio, but makes the metal more reactive chemically than would otherwise be the case.

Ordinarily, there is no advantage in having the phosphorous content higher than 4.0%. Generally speaking, the amount of phosphorous added to the metallic iron melt above 0.6% will be a matter of over-all economics.

One of the features of the invention is the fact that the melting procedure can be carried out in an ordinary foundry cupola. This means that manufacture of the product can be convenient and economical.

Another feature of the invention is the use of phosphate rock or a concentrate thereof as the source of phosphorous.

Comminution can be carried out in various ways. Thus, the molten ferrous metal may be cast into molds to form brittle plates about one-half inch in thickness, which are then subjected to impact crushing in some suitable manner, as by use of a drop hammer. The resulting, relatively large fragments may then be subjected to further crushing, as by use of a conventional hammer mill, to produce chips for further size reduction in a rod mill or some other suitable type of grinding equipment utilizing impact as the crushing force. The fragments are reduced in size to preferably minus 35 mesh, although the particle size should be determined by the manner in which the precipitant product is to be used. For example, if a precipitation cone, such as that disclosed by copending application Serial Number 181,001, filed March 20, 1962, by Alexander E. Back, Kenneth E. Fisher, and John Kocherhans, entitled "Process and Apparatus for the Precipitation of Copper from Dilute Acid Solutions," now U.S. Patent No. 3,154,411, is employed, minus 35 mesh is preferred. If, however, the more conventional precipitation launder is used, a coarser size is preferable, and if contact between the copper-bearing solution and the precipitant is accomplished by slurry agitation, as in the so-called LPF (leach-precipitation-flotation) process, a finer size is preferable.

Instead of first casting the molten ferrous metal into plates or slabs and breaking these into pieces and then into chips, the chips may be produced in the first instance by casting in any suitable manner.

Although the phosphorous can be supplied to the melt in any suitable manner, as by the addition of ferrophosphorous, one important aspect of the invention as previously mentioned is the use of phosphate rock or a concentrate thereof accompanied by a reducing agent in quantity sufficient to insure reduction of the phosphorous content of the rock.

The new product and process of manufacturing it, constituting the invention, are described in detail hereinafter with respect to the specific characteristics and procedures set forth in the accompanying drawing as representative of the best mode presently known of carrying out the invention in commercial practice.

In the drawing, the single figure is a flowsheet based on the use of a foundry cupola for melting the feed material.

Referring to the drawing:

The preferred procedure is to charge into a foundry cupola a quantity of commercial scrap iron (customarily made up almost entirely of steel) along with coke, a conventional flux, and enough phosphate rock of concentrate thereof to yield a product containing about 0.6% to 4.0% phosphorous by weight. Coke used in the cupola charge serves to reduce the phosphate.

The phosphorous addition, along with carbon pick-up, will yield a low-melting product.

The steel scrap will ordinarily contain less than 0.5% carbon, 0.1% phosphorous, and 0.1% silicon and the phosphate rock or concentrates will ordinarily contain 20–30% $P_2O_5$. The quantities of the several materials making up the furnace charge in any particular instance are determined in conventional manner on the basis of the desired melting temperature and the desired phosphorous content of the resulting product.

The molten metal from the cupola is cast in the form of slabs, plates, chips, or other convenient shapes for impact breakage. After solidifying and cooling, the brittle metal is broken into pieces of suitable size for feeding into an impact crushing mill of some suitable type, such as a hammer mill. Chips will ordinarily be of proper size. A rod mill is advantageously utilized for secondary crushing.

The cast, solidified, ferrous metal will be essentially metallic iron, and will contain about 0.1% to 0.3% silicon and at least 0.6% phosphorous. It will be highly brittle and will fracture easily under impact to produce rough particles having a high surface-to-weight ratio.

The crushed material is screened to desired size range, resulting in a mass of discrete, fragmentary particles of ferrous metal as a final, low cost product suitable for use as a precipitant for copper from solution. Because of its low silicon content, not more than about 0.3% by weight, this product is especially adapted for such use.

A ferrous smelting operation utilizing commercial scrap iron and phosphate rock, or a concentrate thereof, is believed to be new. It contributes significantly to the low cost of the product described above, and may even, under favorable circumstances, enable the use of relatively expensive pig iron or the like as the source of iron.

It should be realized that some other melting apparatus, such as an electric furnace, may be utilized for melting purposes instead of a foundry cupola, in which event a carbonaceous reducing agent must be added to the charge if phosphate rock or a concentrate thereof is used as the source of phosphorous.

Should pig iron or the like be used as the source of iron for the product, along with phosphate rock or a concentrate thereof as the source of phosphorous, it may not be necessary to add a reducing agent, because of the relatively high carbon content of the iron. If pig iron or the like is used, however, the product will not have the highly desirable, low silicon content previously described.

Whereas there is here illustrated and described a preferred specific procedure presently regarded as the best mode of carrying out the invention, it should be understood that various changes may be made without departing from the inventive subject matter particularly pointed out and claimed herebelow.

We claim:

1. A ferrous metal product having a high surface-to-weight ratio and useful as a precipitant for copper values in solution, said product being in the form of a mass of discrete and particulate fragments of metallic iron consisting essentially of metallic iron, except for minor impurities, not more than, by weight, about 0.3% silicon, and phosphorous in the range of from 0.6% to about 4% to make the metal brittle and easily fragmented.

2. A process for producing a ferrous metal product having a high surface-to-weight ratio and useful as a precipitant for copper values in solution, comprising the steps of melting commercial scrap iron; supplying sufficient phosphorous to the melt to make a molten metal consisting essentially of metallic iron, except for minor impurities, not more than, by weight, about 0.3% silicon, and phosphorous in the range of from 0.6% to about 4%, which metal, when solidified, is brittle and easy to break; solidifying the said molten metal; and breaking the solidified metal into a mass of discrete, particulate fragments.

3. A process as set forth in claim 2, wherein the melting is carried out in a foundry cupola.

4. A process as set forth in claim 2, wherein the melting operation is carried out under reducing conditions and the phosphorous is supplied to the melt by at least one phosphorous-bearing material selected from the group consisting of phosphate rock and a phosphate rock concentrate.

5. A process as set forth in claim 2, wherein the breaking of the solidified metal is effected by impact crushing.

6. A process as set forth in claim 5, wherein the impact crushing includes preliminary crushing in an impact mill and final crushing in a rod mill.

7. A process for producing a ferrous metal product having a high surface-to-weight ratio and useful as a precipitant for copper values in solution, comprising the steps of charging, into a melting furnace, commercial scrap iron, at least one phosphorous-bearing material selected from the group consisting of phosphate rock and a phosphate rock concentrate, and a reducing agent for the phosphorous contained in said phosphorous-bearing material; melting the charge in said furnace under reducing conditions to form a molten ferrous metal consisting essentially of metallic iron, except for minor impurities, not more than, by weight, about 0.3% silicon, and phosphorous in the range of from 0.6% to about 4%, which metal, when solidified, is brittle and easy to break; withdrawing the molten metal from the furnace and solidifying it; and breaking the solidified metal into a mass of discrete, particulate fragments.

8. A process for producing ferrous metal product, comprising the steps of fusing metallic iron and a mineral phosphate, under reducing conditions to produce a molten ferrous metal consisting essentially of metallic iron, except for minor impurities, not more than, by weight, about 0.3% silicon, and phosphorous in the range of from 0.6% to about 4%, which metal, when solidified, is brittle and easily fragmented; solidifying said molten metal; and fragmenting the solidified metal to form a finely divided ferrous metal product for use as a precipitant for copper from solutions containing copper values.

References Cited

UNITED STATES PATENTS

| | | | |
|---|---|---|---|
| 1,475,976 | 12/1923 | Warner | 75—132 |
| 1,646,268 | 10/1927 | Warner | 75—132 |

OTHER REFERENCES

Harold E. McGannon, The Making, Shaping and Treating of Steel, 8th edition, August 1964, p. 1021.

DAVID L. RECK, *Primary Examiner.*

HYLAND BIZOT, *Examiner.*

W. W. STALLARD, *Assistant Examiner.*